US006725149B2

(12) United States Patent
Wada et al.

(10) Patent No.: US 6,725,149 B2
(45) Date of Patent: Apr. 20, 2004

(54) ELECTRONIC CONTROL DEVICE FOR INTERNAL COMBUSTION ENGINE

(75) Inventors: Shuichi Wada, Hyogo (JP); Koji Nishimoto, Tokyo (JP); Norio Matsumoto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 69 days.

(21) Appl. No.: 10/136,354

(22) Filed: May 2, 2002

(65) Prior Publication Data

US 2003/0100989 A1 May 29, 2003

(30) Foreign Application Priority Data

Nov. 27, 2001 (JP) ...................................... 2001-360753

(51) Int. Cl.[7] ................................................ G06F 19/00

(52) U.S. Cl. ....................... 701/115; 123/361; 123/399; 123/435; 701/114

(58) Field of Search ................................ 701/101, 114, 701/115; 123/361, 399, 435, 436, 353, 352

(56) References Cited

U.S. PATENT DOCUMENTS 5,546,907 A * 8/1996 Komoriya et al. .......... 123/478
5,657,736 A * 8/1997 Maki et al. ................. 123/673
5,908,463 A * 6/1999 Akazaki et al. ............. 701/104
5,988,137 A * 11/1999 Tamura et al. .............. 123/295
6,101,998 A * 8/2000 Tamura et al. .............. 123/295

FOREIGN PATENT DOCUMENTS

JP 5-312087 11/1993

* cited by examiner

*Primary Examiner*—John Kwon
(74) *Attorney, Agent, or Firm*—Sughrue Mion, PLLC

(57) ABSTRACT

There are provided, various sensors for detecting the operating state of the internal combustion engine; a rotational speed sensor, an air flow sensor, a throttle sensor, an intake air pressure sensor of an internal combustion engine; a storage where the charging efficiency corresponding to the rotational speed and throttle travel in the standard atmospheric condition is previously stored and set as a two-dimensional map, for outputting the stored and set value corresponding to the rotational speed and the throttle travel; and a CPU correcting the atmospheric pressure relational value including the atmospheric pressure calculated based on information of the intake air amount, rotational speed, charging efficiency, and throttle travel of the internal combustion engine by using the atmospheric pressure relational value including the atmospheric pressure calculated based on information of the rotational speed, throttle travel, and intake tube pressure of the internal combustion engine.

2 Claims, 2 Drawing Sheets

ELECTRONIC CONTROL DEVICE FOR INTERNAL COMBUSTION ENGINE

This application is based on Application No. 2001-360753, filed in Japan on Nov. 27, 2001, the contents of which are hereby incorporated by reference.

BACKGROUND OF THE INVENTION

1. Field of the Invention

The present invention relates to an electronic control device for an internal combustion engine wherein an atmospheric pressure relational value including the atmospheric pressure is determined by calculation from other control parameters for the internal combustion engine and the atmospheric pressure relational value is used as an auxiliary parameter for control.

2. Description of the Related Art

Conventionally, for example, as shown in Japanese Patent Laid-Open No. 5-312087, an electronic control device for an internal combustion engine has been well known, where the atmospheric pressure relational value including the atmospheric pressure is calculated based on the information of the intake air amount, rotational speed, charging efficiency, and throttle travel of the internal combustion engine.

Furthermore, for example, as shown in Japanese Patent Laid-Open No. 2001-132522, an electronic control device for an internal combustion engine has also been well known, where the atmospheric pressure relational value including the atmospheric pressure is calculated based on the information of the rotational speed, throttle travel, and intake tube pressure of the internal combustion engine. However, an electronic control device for an internal combustion engine which uses both the charging efficiency information or the like and the intake tube pressure information or the like to calculate the atmospheric pressure relational value including the atmospheric pressure has not yet been proposed.

By the way, such an arithmetic value of the atmospheric pressure relational value including the atmospheric pressure using the charging efficiency information or the like is determined according to a specified arithmetic expression which takes the ratio between the two dimensional map value of the charging efficiency corresponding to the rotational speed and the throttle travel in the previously set standard atmospheric condition or the relational value of the charging efficiency, and the actually measured charging efficiency, and therefore, an error depending on the body difference (load because of the difference in the piston-cylinder friction coefficient or the like) of each internal combustion engine may be caused.

The present invention is made to solve such problems, and it is an object to provide an electronic control device for an internal combustion engine wherein in the atmospheric pressure detecting system with no atmospheric pressure sensor, the information of the intake tube pressure and the information of the rotational speed, charging efficiency, and throttle travel are chosen and used depending on the operating area, and the arithmetic frequency and accuracy of the atmospheric pressure relational value in all operating areas can be raised.

SUMMARY OF THE INVENTION

The electronic control device for an internal combustion engine according to the present invention comprises: various kinds of sensors for detecting the operating state of the internal combustion engine; rotational speed detecting means for detecting the rotational speed of the above-described internal combustion engine; intake air amount detecting means for detecting the intake air flow rate of the above-described internal combustion engine; throttle travel detecting means for detecting the throttle travel of the above-described internal combustion engine; intake tube pressure detecting means for detecting the intake tube pressure of the above-described internal combustion engine; storing means in which the charging efficiency corresponding to the rotational speed and the throttle travel in the standard atmospheric condition is previously stored and set as a two-dimensional map, and which outputs the above-described stored and set value corresponding to the above-described rotational speed and the above-described throttle travel; and correcting means for correcting the atmospheric pressure relational value including the atmospheric pressure calculated based on the information of the intake air amount, rotational speed, charging efficiency, and throttle travel of the above-described internal combustion engine by using the atmospheric pressure relational value including the atmospheric pressure calculated based on the information of the rotational speed, throttle travel, intake tube pressure of the above-described internal combustion engine.

Furthermore, the electronic control device for an internal combustion engine according to the present invention is a device, wherein the above-described correcting means comprises: first arithmetic means for calculating the atmospheric pressure relational value including at least the atmospheric pressure value according to a specified arithmetic expression of taking a ratio between the charging efficiency determined by selectively using the intake air amount and rotational speed of the above-described internal combustion engine and the stored and set value outputted from the above-described storing means; second arithmetic means for calculating the atmospheric pressure relational value including at least the atmospheric pressure based on the intake tube pressure detected in the case of being in a specific operating state corresponding to the rotational speed, throttle travel, and intake tube pressure of the above-described internal combustion engine; and comparing means for comparing the arithmetic value obtained from the above-described first arithmetic means and the arithmetic value obtained from the above-described second arithmetic means, and the comparison result of the above-described comparing means is reflected to the arithmetic value obtained by the above-described first and second arithmetic means.

DETAILED DESCRIPTION OF THE PREFERRED EMBODIMENTS

The preferred embodiment of the present invention will be described below based on the drawings.

Embodiment 1

Figure 1:
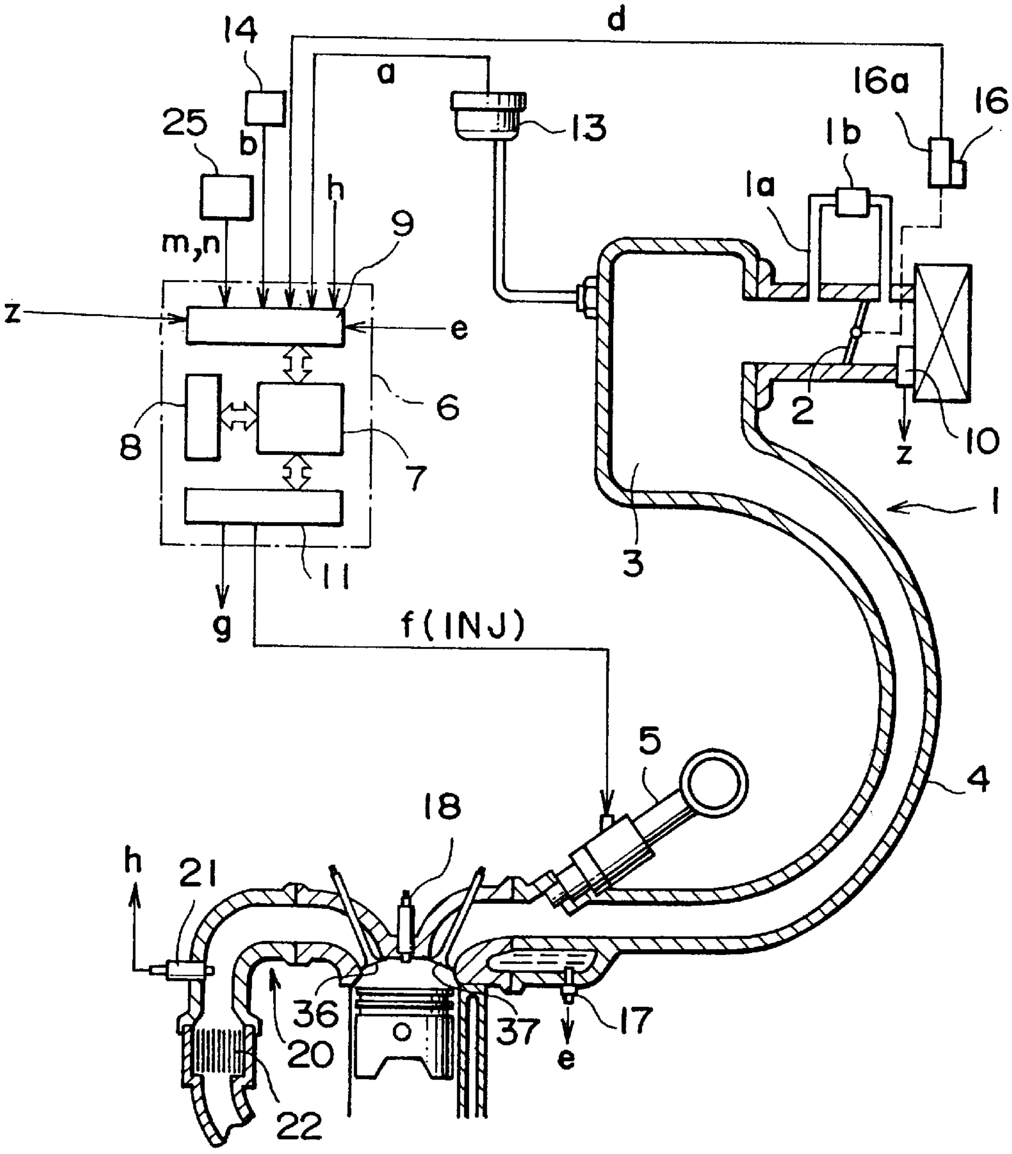
FIG. 1 is a block diagram showing the electronic control device for an internal combustion engine according to the embodiment 1 of the present invention.

FIG. 1 is a block diagram showing the electronic control device for an internal combustion engine according to Embodiment 1 of the present invention.

In the drawing, the engine where the structure of one cylinder is roughly shown as one example is a four cylinder engine for an automobile, and in the intake system 1 of the engine, an air flow sensor 10 as the intake air amount detecting means for measuring the air amount flowing from the air cleaner is provided, and on the downstream side thereof, a throttle valve 2 which opens and closes according to the accelerator pedal (not shown in the figure) is provided, and on the downstream side thereof, a serge tank 3 is provided, and the intake air from the serge tank 3 is taken in the cylinder through an intake valve 37.

In this intake system 1, a bypass passage 1*a* that is a detour going around the throttle valve 2 is provided, and in that bypass passage 1*a*, a flow rate control valve (hereafter, referred to simply as "ISC valve") 1*b* for controlling the air amount passing through the bypass passage 1*a* is provided. This ISC valve 1*b* is controlled when performing the idle rotation control (hereafter, referred to simply as "ISC") to correct the intake air amount so that at least the engine rotational speed NE in the idle operating state becomes the idle target rotational speed, and furthermore, it is opening-controlled in the case where a unit which becomes the load to the engine such as an air conditioner or head lights is operated.

Near the end part on the cylinder head side of an intake manifold 4 of the intake system 1 leading to the serge tank 3, furthermore, a fuel injection valve 5 is provided, and it is arranged that this fuel injection valve 5 is controlled by an electronic control device 6. Furthermore, to an exhaust system 20, an $O_2$ sensor 21 for measuring the oxygen density in the exhaust gas discharged through an exhaust valve 36 from the combustion chamber is attached on the upstream side of a three-way catalyst 22 provided in the tube passage leading to the muffler (not shown in the figure).

The electronic control device 6 is mainly composed of a microcomputer system including a central processing unit 7 as correcting means, a storing device 8, an input interface 9, and an output interface 11. Into that input interface 9, an intake air amount signal z outputted from the air flow sensor 10 which measures the air amount flowing in from the air cleaner, an intake air pressure signal a outputted from an intake air pressure sensor 13 as the intake tube pressure detecting means for detecting the pressure (intake tube pressure) in the serge tank 3, a rotational speed signal b outputted from a rotational speed sensor 14 as the rotational speed detecting means for detecting the engine rotational speed NE, a crank angle signal m and a cylinder discrimination signal n outputted from a cam position sensor 25, a throttle travel signal outputted from a throttle sensor 16*a* corresponding to the opening of the throttle valve 2, an IDL signal d outputted from an idle switch 16 which detects the opening and closing state of the throttle valve 2, a water temperature signal e outputted from a water temperature sensor 17 which detects the cooling water temperature of the engine, and a voltage signal h outputted from the above-described $O_2$ sensor 21, or the like are inputted.

On the other hand, it is arranged that from the output interface 11, a driving pulse INJ that is a fuel injection signal f is outputted to the fuel injection valve 5, and an ignition signal g is outputted to a spark plug 18.

In the electronic control device 6, a program is stored, by which the charging efficiency is determined (arithmetic method is not shown in the figure) by using the intake air amount signal z outputted from the air flow sensor 10 and the rotational speed signal b outputted from the rotational speed sensor 14 as the main information, and the basic injection time, that is, the basic injection amount TAUB is corrected by various kinds of correction coefficients determined corresponding to the operating state of the engine to determine the final injection time that is the fuel injection opening time, that is, the fuel injection amount TAU, and the fuel injection valve 5 is controlled by that determined time to inject the fuel injection amount TAU corresponding to the operating state of the engine from the fuel injection valve 5 to the intake system 1.

Furthermore, in the case of this program, in the storing device 8, the charging efficiency in the standard atmospheric condition is stored as a two-dimensional map by using the rotational speed and the throttle travel as parameters, and furthermore, the set data for the judgment and calculation is also previously stored, and if the judgment condition is ready, the atmospheric pressure relational value including at least the atmospheric pressure value is calculated according to a specified arithmetic expression which takes a ratio between the present detected charging efficiency and the above-described previously stored charging efficiency, and the calculated atmospheric pressure is stored in the storing device 8.

Furthermore, in the case of this program, when the ignition switch (not shown) is turned ON before the starting, the atmospheric pressure is detected based on the intake air pressure signal a outputted by the intake air pressure sensor 13 at that moment, and the detected atmospheric pressure is stored in the storing device 8. Furthermore, when the throttle valve 2 becomes full open during the traveling, the intake tube pressure PMTP at that moment is corrected based on the engine rotational speed NE, and is stored in the storing device 8. As for this stored atmospheric pressure, that is, the learned atmospheric pressure read-in value, in the case where the throttle valve 2 becomes full open during the traveling, the value at the full throttle is stored as the new atmospheric pressure read-in value instead of the atmospheric pressure read-in value stored at that moment.

Figure 2:
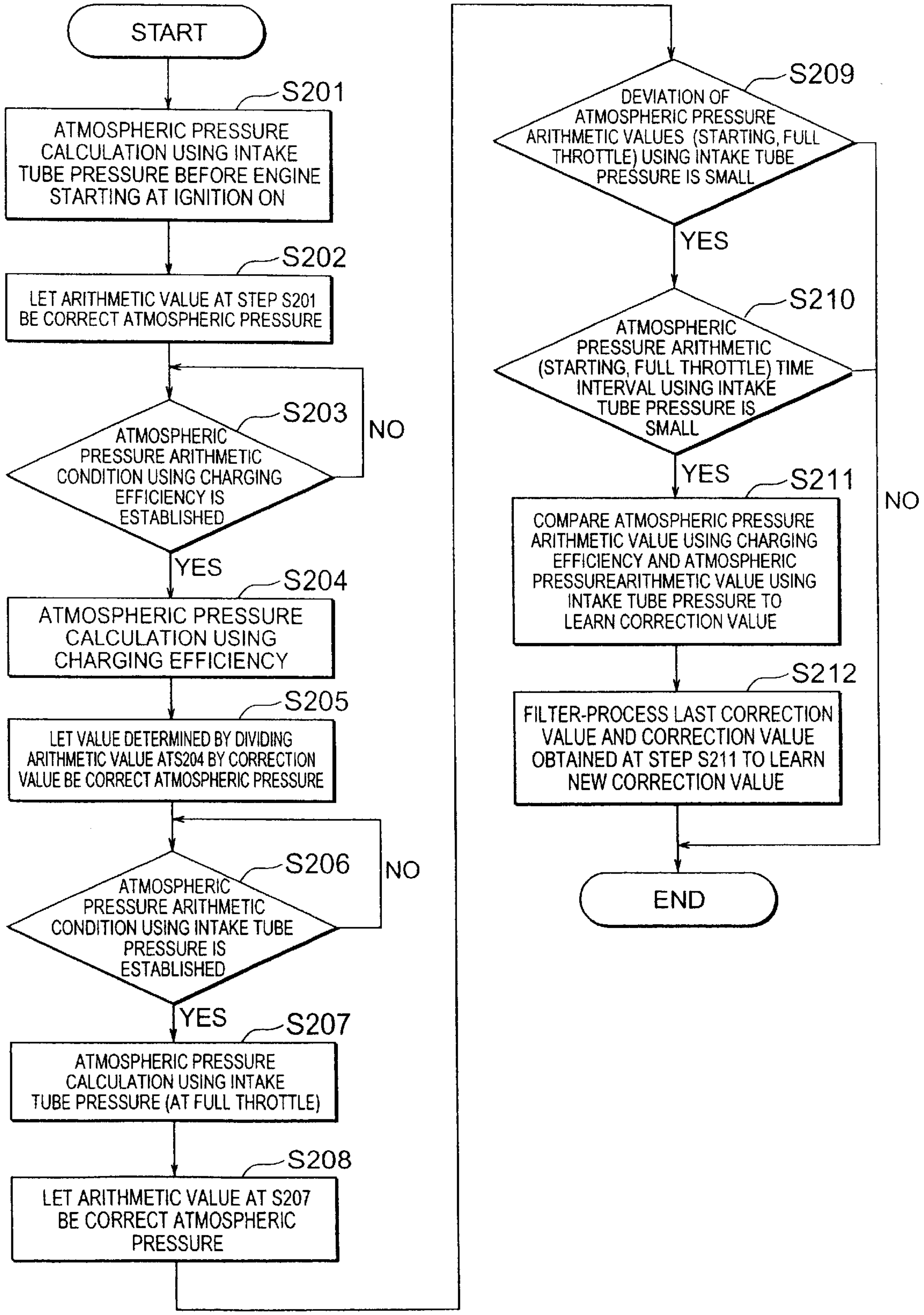
FIG. 2 is a flow chart which is provided for the explanation of the action of Embodiment 1 of the present invention.

Next, the rough procedure of a program by which the atmospheric pressure arithmetic value obtained from the charging efficiency is corrected by using the atmospheric pressure arithmetic value obtained from the intake tube pressure will be described by referring to FIG. 2.

At step S201, when the ignition switch (not shown) is turned ON before the starting, the atmospheric pressure CAPST is calculated based on the intake air pressure signal a outputted by the intake air pressure sensor 13 at that moment, and after that, at step S202, that value is made to be the correct atmospheric pressure CAP (atmospheric pressure to be used for the actual engine control).

At step S203, whether the atmospheric pressure arithmetic condition using the charging efficiency (for example, the engine rotational speed and the throttle travel being stable at constant values in the partial condition, or the like) is established or not is judged, and if it is not established, that is, NO, the judgment is continued until it becomes YES, and if it is YES, the step advances to step S204 (first arithmetic means).

At step S204, according to the above-described method, by using the data of the engine rotational speed, throttle travel, and charging efficiency, the atmospheric pressure value CAPECO is calculated, and the step advances to step S205. After that, at step S205, the correction by using the correction value ZH stored in the storing device 8 and the following expression (1) is applied to the atmospheric pressure value obtained at step S204, and that value is made to be the correct atmospheric pressure CAP.

$$CAP=CAPECO\div ZH \tag{1}$$

At step S206, whether the atmospheric pressure arithmetic condition using the intake tube pressure (for example, the throttle being full open, or the like) is established or not is judged, and if it is not established, that is, it is NO, the judgment is continued until it becomes YES, and if it is YES, the step advances to step S207 (second arithmetic means).

At step S207, according to the above-described method, by using the data of the engine rotational speed, throttle travel, and intake tube pressure, the atmospheric pressure value CAPZN is calculated, and after that, at step S208, that value is made to be the correct atmospheric pressure value CAP (the atmospheric pressure to be used for the actual engine control).

At step S209, the atmospheric pressure (at the starting time) CAPST calculated at step S201 and the atmospheric pressure (at the full throttle) CAPZN calculated at step S207 are compared, and if the deviation thereof is large, the present program is finished, and if the deviation is small, the step advances to step S210. Furthermore, at step S210, the time (at the starting time) calculated at step S201 and the time (at the full throttle) calculated at step S207 are moreover compared, and if the time interval thereof is large, the present program is finished, and if the interval is small, it is judged that the actual atmospheric pressure (at the starting time) at the time when calculated at step S201, the actual atmospheric pressure (charging efficiency) at the time when calculated at step S207, and the actual atmospheric pressure (at the full throttle) at the time when calculated at step S204 are the same, and the step advances to step S211 (comparing means).

At step S211, for example, by using the following arithmetic expressions (2), (3), the correction value ZH is learned.

$$\text{Average value}=\{\text{atmospheric pressure (at starting time) } CAPST+\text{atmospheric pressure (at full throttle) } CAPZN\}\div 2 \quad (2)$$

$$\text{Correction value } ZH=\text{atmospheric pressure (charging efficiency) } CAPEO\div\text{average value} \quad (3)$$

Next, at step S212, by using the following expression (4), the filter processing of the correction value ZH is performed, and the filter-processed correction value ZH (i) is stored in the storing device 8.

$$\text{Correction value } ZH\,(i)=K\times ZH(i-1)+(1-K)\times ZH \quad (4)$$

here, K is a value of 0 to 1, and ZH (i−1) is the correction value obtained by the last processing.

Furthermore, this correction value ZH or the filter-processed correction value ZH (i) is also stored after the ignition has been turned OFF, and it is arranged that this correction can be performed again when the atmospheric pressure value CAPECO is calculated by using the data of the engine rotational speed, throttle travel, and charging efficiency after the ignition has been turned ON like step S205.

Thus, in the case of the present embodiment, the atmospheric pressure relational value including the atmospheric pressure which is calculated based on the information of the intake air amount, rotational speed, charging efficiency, and throttle travel of the internal combustion engine is corrected by the atmospheric pressure relational value including the atmospheric pressure which is calculated based on the information of the rotational speed, throttle travel, and intake tube pressure of the internal combustion engine, and therefore, the error of the atmospheric pressure arithmetic value depending of the body difference (load depending on the difference in the piston-cylinder friction coefficient, or the like) of each internal combustion engine can be made small, and furthermore, by effectively using both systems, the arithmetic frequency of the atmospheric pressure relational value including the atmospheric pressure can be raised.

Furthermore, in the case of the above-described embodiment, the filter processing is performed at step S212 to find the correction value ZH (i), but it is also possible that the filter processing is not performed and the correction value ZH determined at step S211 is made to be ZH (i) as it is.

What is claimed is:

1. An electronic control device for an internal combustion engine, comprising:

rotational speed detecting means for detecting the rotational speed of said internal combustion engine;

intake air amount detecting means for detecting the intake air flow rate of said internal combustion engine;

throttle travel detecting means for detecting the throttle travel of said internal combustion engine;

intake manifold pressure detecting means for detecting the intake manifold pressure of said internal combustion engine;

storing means in which the charging efficiency corresponding to the rotational speed and the throttle travel in the standard atmospheric condition is previously stored and set as a two-dimensional map, and which outputs said stored and set value corresponding to said rotational speed and said throttle travel; and correcting means for correcting the atmospheric pressure relational value including the atmospheric pressure calculated based on the information of the intake air amount, rotational speed, charging efficiency, and throttle travel of said internal combustion engine by using the atmospheric pressure relational value including the atmospheric pressure calculated based on the information of the rotational speed, throttle travel, and intake manifold pressure of said internal combustion engine.

2. The electronic control device for an internal combustion engine according to claim 1, wherein said correcting means comprises:

first arithmetic means for calculating an atmospheric pressure relational value including at least an atmospheric pressure value according to a specified arithmetic expression of taking a ratio between the charging efficiency determined by selectively using the intake air amount and rotational speed of said internal combustion engine and the stored and set value outputted from said storing means;

second arithmetic means for calculating an atmospheric pressure relational value including at least an atmospheric pressure based on the intake manifold pressure detected in the case of being in a specific operating state, corresponding to the rotational speed, throttle travel, and intake manifold pressure of said internal combustion engine; and comparing means for comparing the arithmetic value obtained from said first arithmetic means and the arithmetic value obtained from said second arithmetic means, wherein the comparison result of said comparing means is reflected to the arithmetic value obtained by said first and second arithmetic means.

* * * * *